Aug. 20, 1968　　　H. A. LINGARD　　　3,397,483
MODEL-RAILROAD TRUCK ASSEMBLY
Filed May 12, 1966　　　　　　　　　　　　2 Sheets-Sheet 1

INVENTOR.
HAROLD A. LINGARD
BY Robertson and Youtie
ATTORNEYS

INVENTOR.
HAROLD A. LINGARD
BY Robertson and Voutie
ATTORNEYS

United States Patent Office 3,397,483
Patented Aug. 20, 1968

3,397,483
MODEL-RAILROAD TRUCK ASSEMBLY
Harold A. Lingard, Merchantville, N.J., assignor to Mantua Metal Products Co., Inc., Rose Hill, N.J., a corporation of New Jersey
Filed May 12, 1966, Ser. No. 549,632
6 Claims. (Cl. 46—216)

This invention relates generally to model-railroad cars, and is especially concerned with a unique construction of truck and coupler for railroad cars.

It is an important object of the present invention to provide a unique and highly improved model-railroad truck and coupler construction which accurately simulates full-size equipment in appearance and operation, which is more economical to manufacture and assemble than heretofore possible, and which is much more quickly and easily assembled and disassembled than corresponding prior-art devices.

It is a more particular object of the present invention to provide a model-railroad car truck which may be integrally formed, say of plastic, by conventional mass-production techniques, to achieve the production speed and economy thereof.

It is another object of the present invention to provide a model-railroad car-coupler construction, which is also of simple and durable structure, and capable of economic manufacture, say of plastic, by mass-production procedures.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figures 1, 2:
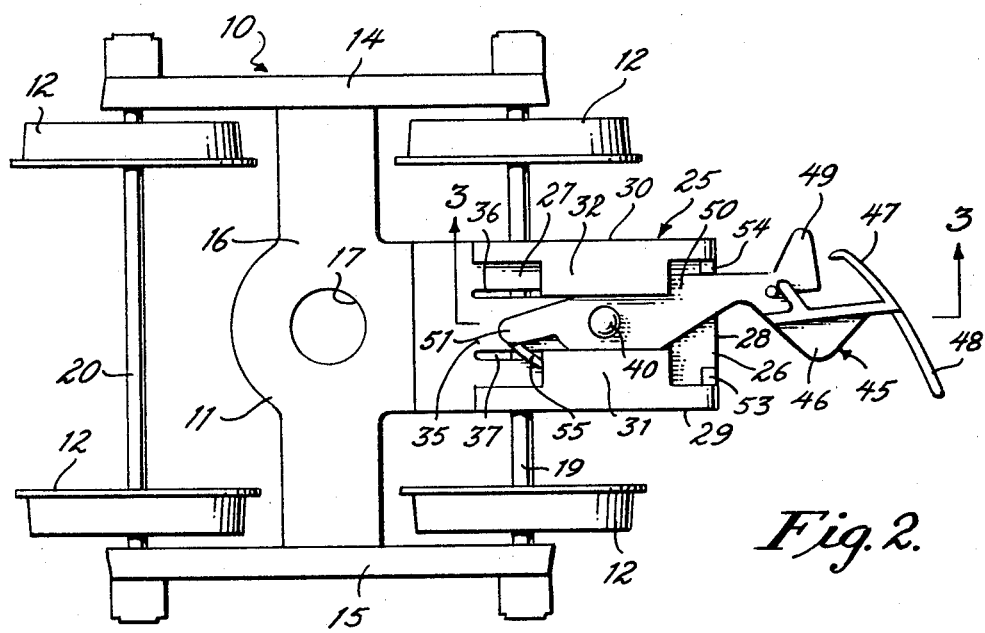
FIGURE 1 is a side elevational view showing a model-railroad car truck and coupling element constructed in accordance with the teachings of the present invention.
FIGURE 2 is a top plan view of the truck and coupler-element assembly of FIGURE 1.

Referring now more particularly to the drawings, and specifically to FIGURES 1 and 2 thereof, a wheeled truck is there generally designated 10, and may include a frame 11 and rail-engageable wheels 12. The frame 11 may include a pair of laterally spaced, longitudinally extending sidepieces 14 and 15, connected together at opposite medial regions by a cross member 16, which may be formed medially between the sidepieces with a vertically extending thru pivot hole 17. The sidepieces 14 and 15, and cross member 16 may be integrally molded, say of plastic, or other suitable material.

The wheels 12 conventionally number four, a pair of axles 19 and 20 each carrying a pair of wheels 12, with each axle extending between adjacent ends of frame sidepieces 14 and 15, and journaled therein to rotatably mount the wheels in rectangular arrangement on the truck frame 11. The material of which the integral truck frame 11 is formed may advantageously have inherent resiliency sufficient to enable the axle and wheel assemblies to be removably journaled in the side pieces 14 and 15, for ease of assembly. One such material is that sold under the trademark "Delrin" by E. I. du Pont de Nemours & Co., but other suitable materials may be employed.

Projecting from a medial region of cross member 16, generally horizontally and longitudinally of the truck 10, over and beyond one of the axles 19, is an extension, generally designated 25. The extension 25 is formed integrally with the cross member 16 and remainder of truck frame 11, and may be of an elongate, hollow configuration having its outer end open, as at 26. In the illustrated embodiment, the hollow longitudinal extension 25 is of somewhat boxlike configuration, including a bottom wall 27 formed integral with and extending generally horizontally from a medial region of the cross member 16, longitudinally of the truck 11. The bottom wall 27 is of generally rectangular-outline configuration, being spaced laterally, medially between one pair of wheels 12, and terminating at its outer end 28 longitudinally outwardly beyond the adjacent pair of wheels 12. Upstanding from opposite sides of the bottom wall 27 are a pair of laterally spaced, longitudinally extending side walls 29 and 30, while a pair of upper wall portions or flanges 31 and 32 extend laterally inwardly from the upper edges of respective side walls 29 and 30 spacedly over the bottom wall 27 and terminate in spaced relation short of each other. Thus, the upper flanges 31 and 32 combine to define a laterally medially open top wall for the extension 25.

Figure 3:
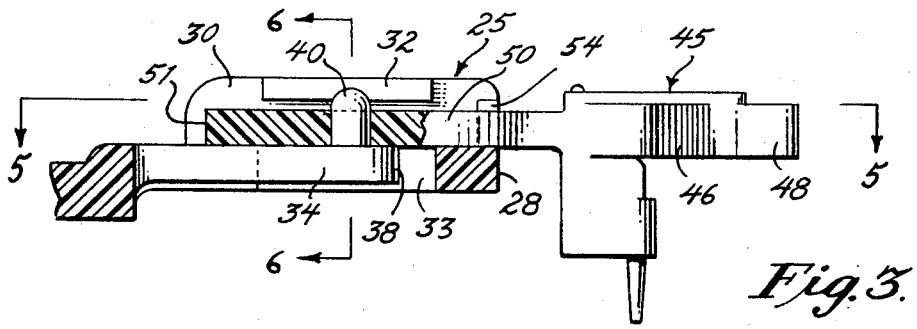
FIGURE 3 is a longitudinal sectional elevational view taken generally along the line 3—3 of FIGURE 2.

The extension bottom wall 27 may be configured with a central opening 33 between the side walls 29 and 30, and substantially directly below the top wall portions or flanges 31 and 32. Further, a central region 34 of the bottom wall 27 has one end fixedly secured to the cross member 16, as by integral formation therewith at 35. The bottom wall 27 is slit or cut away to define a pair of laterally spaced slots 36 and 37 extending from the anchored end 35 of central bottom-wall region 34 longitudinally outward to the bottom-wall opening 33. The central bottom-wall region 34 extends from its fixed or anchored end 35, between the slots 36 and 37 and therebeyond into the bottom-wall opening 33, there terminating in a free end 38. By the nature of the material of central bottom-wall region 34, and its relatively elongate configuration having only one end anchored at 35, the region 34 defines a resiliently deflectable finger of the material of the bottom wall 27, deflection being illustrated in FIGURE 4. Provided on the free outer end 38 of the bottom-wall region or finger 34 is an upstanding pin 40, which projects interiorly of the hollow extension 25, in alignment with the space between upper flanges 31 and 32. Thus, the finger 34 defines a resilient mounting for the pin 40, whereby the latter may be resiliently yieldably retracted from its position of FIGURE 3 to that of FIGURE 4; and upon release, returned to its position of FIGURE 3.

Advantageously the entire extension 25, as described hereinbefore, may be be integrally formed with the truck frame 11, as by molding of plastic.

Outward of the extension 25 is a coupler element 45 which may include a body 46 provided with a coupling hook 47 having a guide extension 48. An abutment member 49 may also be provided on the body 46. Extending from the body 46 inward through the open end 26 of extension 25 is an arm 50. The arm 50 extends into the extension 25 beneath the upper flanges 31 and 32, between the side walls 29 and 30, and over the bottom-wall finger 34. Further, the arm 50 extends inward beyond the pin 40, terminating at its inner end 51, and is provided with a vertically extending thru opening 52 rotatably receiving the pin 40, as in FIGURES 2, 3, 5 and 6.

The coupling element 45 is thereby pivotally connected to the extension 25, the arm 50 being rotatable about the axis of pin 40 within the limits imposed by a pair of laterally spaced abutments 53 and 54 on the outer ends of respective side walls 29 and 30.

Figure 5:
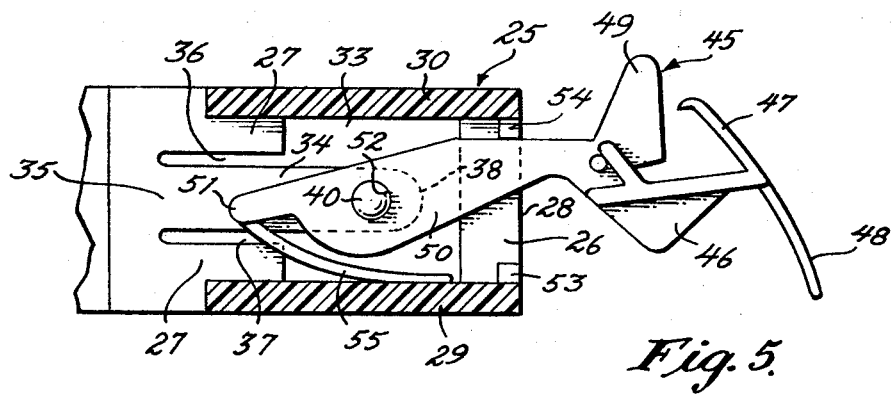
FIGURE 5 is a horizontal sectional view taken generally along the line 5—5 of FIGURE 3.
Figure 6:
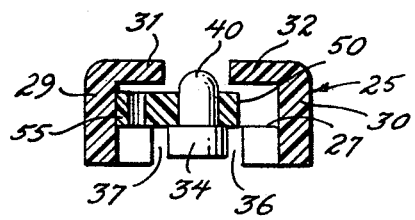
FIGURE 6 is a sectional elevational view taken generally along the line 6—6 of FIGURE 3.

Extending from the inner end 51 of arm 50 is a resilient strip or leaf spring 55. The leaf spring 55 has one end fixed to the inner end 51 of arm 50, and extends therefrom longitudinally outwardly of the truck 10 within the extension 25 into bearing engagement with one of the extension side walls 29 at a location outward of the pin 40. This is best seen in FIGURE 5, where it will be apparent that the resilient bearing engagement of leaf spring 55 with extension side wall 29 resiliently biases the arm 50 in a clockwise direction into limiting engagement with abutment 54. The arm 50 and its associated coupling element 45 are swingable clockwise, against the biasing force of leaf spring 55 until the arm engages abutment 53, as during the coupling operation.

As illustrated, the coupling element 45 may advantageously be integrally fabricated of suitable plastic material, as by molding or other procedure, the leaf spring 55 being of selected proportions to afford the desired resilience.

Figure 4:
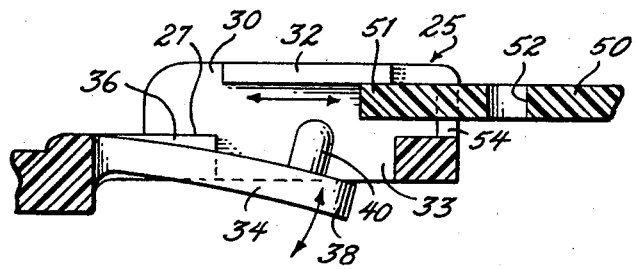
FIGURE 4 is a view similar to FIGURE 3, illustrating assembly and disassembly of the coupler element with the truck.

Assembly of the coupling element 45 with the truck 10 is best seen in FIGURE 4, the pin 40 being depressed by flexure of resilient finger 34 to permit insertion of arm 50 into the extension 25. Upon alignment of the hole 52 with pin 40, the pin engages therein by the resilience of finger 34. Obviously, the coupling element 45 may be disassembled from the extension 25 by reversal of the above procedure, any suitable implement being satisfactory for entry between the upper flanges 31 and 32 against the pin 40 to depress the latter.

From the foregoing, it is seen that a model-railroad truck and coupling element assembly is provided which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. In a model-railroad car, the combination comprising a wheeled frame, a hollow extension on said frame having its outer end open, a pin on said extension projecting interiorly thereof, mounting means mounting said pin on said extension for resilient retraction from the interior thereof, a coupler element outward of said extension, and an arm on said coupler element inserted into said extension loosely through the open end thereof, said arm having a hole removably receiving said pin to mount said coupler for limited rotation about said pin.

2. The combination according to claim 1, said mounting means comprising a resilient finger having one end fixed and extending therefrom to a free end resiliently deflectable toward and away from the interior of said extension, said pin being carried by said free finger end.

3. The combination according to claim 1, in combination with a leaf spring having one end fixed to said arm and having its other end free, for insertion with said arm into said extension and engagement with the interior of said extension to resiliently bias said coupler in one direction of its rotative movement.

4. The combination according to claim 1, said extension comprising a bottom wall projecting integrally from said frame, side walls upstanding from opposite sides of said bottom wall, and a pair of upper flanges extending from respective side walls inwardly toward and terminating in spaced relation with each other spacedly over said bottom wall, said bottom wall being configured to define said finger of the central bottom-wall region, and said pin upstanding from said finger in alignment with the space between said flanges.

5. The combination according to claim 4, in combination with a leaf spring having one end fixed to said arm and having its other end free for insertion with said arm into said extension, said leaf spring having said one end fixed to the inner end of said arm, and having its free end extending outwardly beyond said pin for engagement with the interior of said extension to resiliently bias said coupler in one direction of its rotation movement.

6. The combination according to claim 5, said bottom and side walls, flanges, finger and pin being integrally fabricated of plastic material; and said arm and leaf spring being integrally fabricated of plastic material.

References Cited

UNITED STATES PATENTS 407,446  7/1889  Pemberton _____ 46—216 X

FOREIGN PATENTS 45,319  1/1966  Germany.

LOUIS G. MANCENE, *Primary Examiner.*

C. R. WENTZEL, *Assistant Examiner.*